Aug. 11, 1964   A. H. MERKNER ETAL   3,144,148
CONTAINER HANDLING APPARATUS
Filed July 26, 1961   5 Sheets-Sheet 1

INVENTORS
ALBERT H. MERKNER
CHESTER GUTOWSKI
By Christy, Parmelee & Strickland
his ATTORNEYS Aug. 11, 1964

A. H. MERKNER ETAL 3,144,148

CONTAINER HANDLING APPARATUS

Filed July 26, 1961

INVENTORS
ALBERT H. MERKNER
CHESTER GUTOWSKI
By Christy, Parmelee & Strickland
his ATTORNEYS

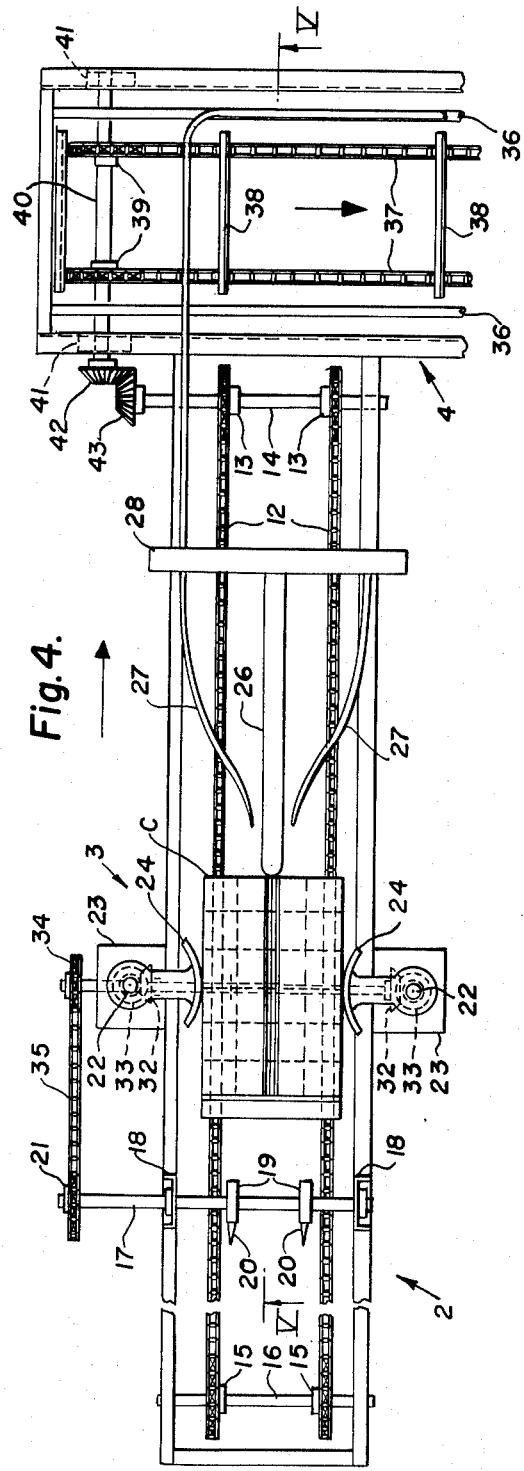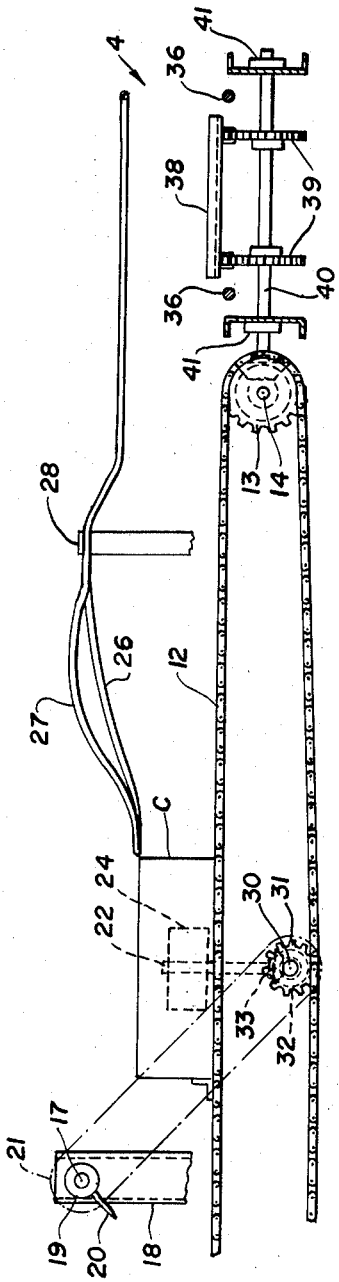

Aug. 11, 1964

A. H. MERKNER ETAL 3,144,148

CONTAINER HANDLING APPARATUS

Filed July 26, 1961

INVENTORS
ALBERT H. MERKNER
CHESTER GUTOWSKI
By Christy, Parmelee & Strickland
his ATTORNEYS

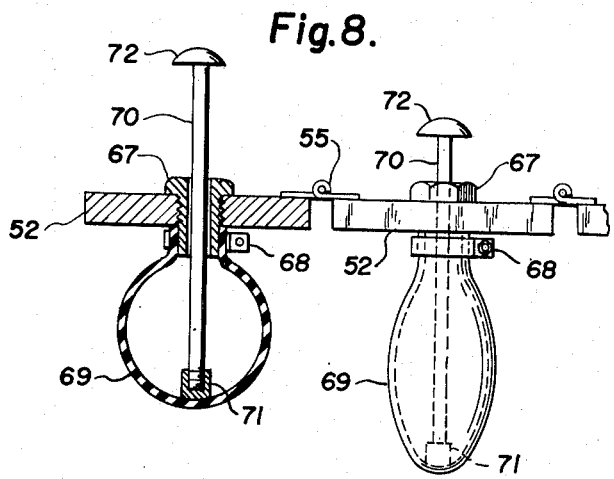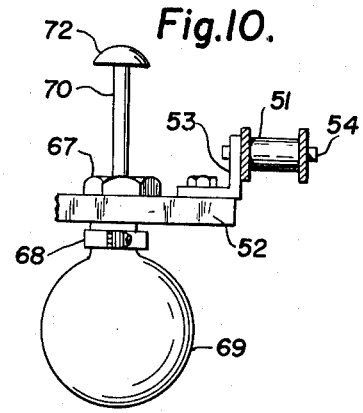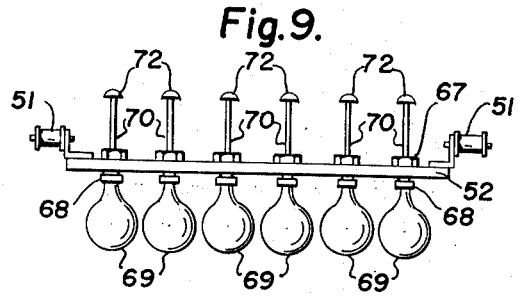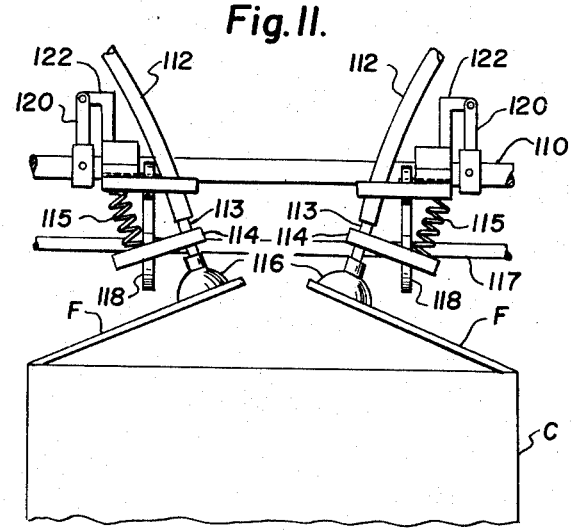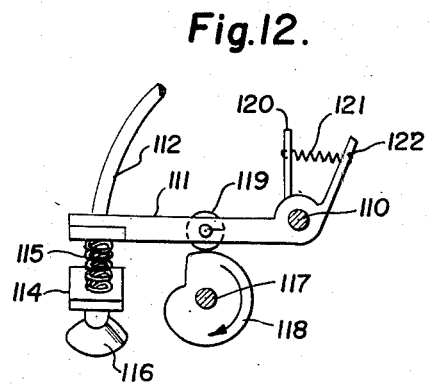

United States Patent Office 3,144,148
Patented Aug. 11, 1964

3,144,148
CONTAINER HANDLING APPARATUS
Albert H. Merkner, Pittsburgh, Pa., and Chester Gutowski, 2903 May St., Pittsburgh 34, Pa.; said Merkner assignor to H. J. Heinz Company, Pittsburgh, Pa., a corporation of Pennsylvania
Filed July 26, 1961, Ser. No. 127,000
13 Claims. (Cl. 214—304)

This invention is for an apparatus for handling containers and especially containers such as glass jars to be filled with food or other product to be hermetically sealed, and which are generally received by the food processor in cartons with the closures for the containers removed.

The invention is particularly useful for use in handling glass jars such as are used for prepared baby foods, or other wide-mouth glass containers used in the food industry, and it will be hereinafter described in connection with such containers, without limitation, however, to its use with other jars or containers to which it may be applicable.

Food jars of the class above referred to are generally packed by the glass jar manufacturer in partitioned "eggcell" type cartons that are already imprinted with the name of the customer or food processer, his trade-mark, and such other information as the customer may specify. The jars are shipped in the unsealed cartons to the food processer. The food processer removes the jars from the cartons, washes, sterilizes, and inspects them, and then passes them into a filling line where they are filled and closure caps applied thereto. The cartons meantime are sent to the packing floor where filled jars are placed in the cartons and the cartons sealed for shipment to the trade.

The present invention is for a machine which will automatically remove the empty jars from the unsealed cartons, transfer them to a conveyor which carries them to washing apparatus and transfers the cartons to a conveyor which removes them for transportation to the packing floor to be packed with filled jars.

According to the present invention, the unsealed containers are first placed on a conveyor that moves them past a flap lifter that opens two opposite cover flaps of the carton. Each carton is then delivered to a second conveyor transverse to the first where the other two flaps are first opened out, after which the cartons move beneath an endless belt having spaced rows of rubber balls thereon. The carton conveyor and the balls on the endless belt move in converging paths, and as they approach the balls are elongated mechanically to a diameter where they will enter the mouths of the jars. After a row of balls is thus entered into a row of jars in the carton, the balls are expanded within the jars to a diameter greater than the opening in the mouth of the jar. The endless belt on which the balls are carried then travels an upward course, lifting the jars by means of the balls from the carton and transfers them to a receiving conveyor where the balls are again elongated to liberate the jars and deposit them on the second conveyor. The carton from which the jars are lifted is carried transversely from beneath the jars which have been lifted therefrom and are being transferred for deposit on the receiving conveyor, so that the carton may be taken away to the packing floor.

The mechanism is simple and positive in its operation, eliminates possible damage to the jars, and removes them with no manual handling.

A primary object of our invention therefore is to provide apparatus for removing empty jars from a carton and depositing them on a conveyor by means of which they can be carried away to be inspected, washed, sterilized, and filled. A further object of our invention is to provide a mechanism for removing the cartons after the jars have been removed therefrom. A still further object of our invention is to provide a novel means for extracting the jars from the cells of the carton in which they are packed in a manner to avoid chipping or breaking them, and in fact handling them more safely than is possible with manual labor. A still further object of the invention is to provide mechanism for opening the cartons preparatory to removal of the jars therefrom.

These and other objects and advantages are secured by our invention as will be more fully understood by those skilled in the art in conjunction with the following description in conjunction with the accompanying drawings.

In the drawings:

FIG. 4 is a top plan view on a larger scale than FIG. 1 showing the initial conveyor on which the cartons are deposited and the mechanism for opening two of the four opposed flaps constituting the cover of the carton;

FIG. 5 is a transverse vertical section in the plane of line V—V of FIG. 4 looking in the direction of the arrows;

FIG. 8 is a view partly in section and partly in elevation, wherein one of the jar-handling balls is shown in section in its expanded condition, and another of the balls is show in elevation in an extended or collapsed condition;

FIG. 9 is a detail view showing a front elevation of one of the ball carrying plates of the conveyor with the balls expanded;

FIG. 10 is a fragmentary elevation on a larger scale of one end of the plate shown in FIG. 9;

FIG. 11 is a fragmentary view showing in side elevation a modified form of carton lid opener; and FIG. 12 is a fragmentary end view of the apparatus shown in FIG. 11.

Figure 1:
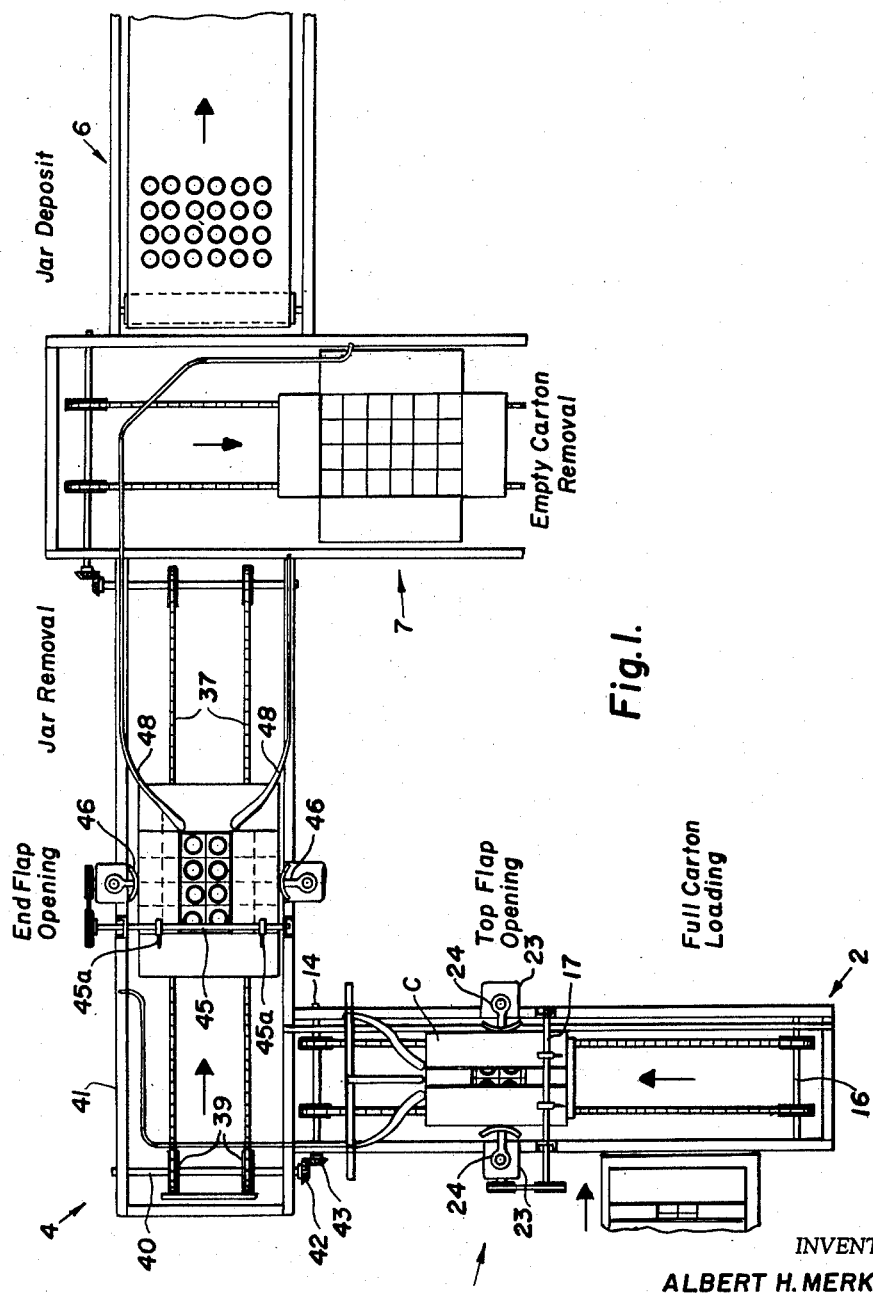
FIG. 1 is a schematic plan view in the nature of a flow diagram showing the path through which the cartons travel, and the stations where the different operations occur.

Referring first to the diagram shown in FIG. 1, there is a carton receiving conveyor 2 which moves in the direction of the arrow. The cartons, filled with empty jars are loaded onto the receiving end of this conveyor at the "Full Carton Loading" station. A typical carton is rectangular with a cellular divider which forms six cells lengthwise of the carton, and four cells crosswise, or a total of twenty-four cells. Such a carton has cover flaps which are along each long side of the carton, and which are folded in above the two end flaps, one on each end wall of the carton. The long flaps, forming the top of the carton, are here designated the "top" flaps, and the other flaps are designated the "end" flaps. Each carton C is placed on the conveyor 2 with its length extending parallel to the direction of travel of the conveyor 2. The conveyor moves the cartons in succession past a station located at 3, designated the "Top Flap Opening" station. With the top flaps opened outwardly, the carton is carried by the first conveyor onto a second conveyor 4 which is at right angles to the first conveyor. This conveyor, as viewed in FIG. 1, moves to the right and the cartons on the second conveyor are then moving with their long axes transverse to the direction of travel. The cartons on the second conveyor move past a station where the end flaps are opened outwardly, designated "End Flap Opening" and the carton with its top and end flaps opened then moves into the "Jar-Removal" station where the jars are lifted from the cartons and transported overhead onto a jar receiving conveyor designated 6, and at the location marked "jar deposit" the jars are released from the carrier that removed them from the cartons and they are here deposited on the receiving conveyor 6. From this conveyor they are carried away to be further processed and filled.

Between the conveyor 4 and the conveyor 6 is a transverse conveyor 7 designated "Empty Carton Removal." The empty cartons are delivered from the conveyor 4 onto this empty carton removal conveyor for delivery to the packing floor where filled containers are placed in them.

Referring now particularly to FIGS. 4 and 5, the arrangement of the initial conveyor 2 and its associated parts may be explained in detail. The conveyor 2 includes parallel endless sprocket chains 12 that pass around sprocket wheels 13 on a transverse drive shaft 14 at the discharge end of the conveyor, and these chains pass around sprockets 15 on a shaft 16 at the receiving end of the conveyor.

Any suitable mechanism may be provided at the receiving end of the conveyor for supplying the cartons one at a time to the conveyor with the long axes of the cartons extending in the direction of travel of the conveyor.

Positioned over the conveyor at the top flap opening station 3 is a shaft 17 mounted in fixed frame members 18. This shaft is located above the conveyor and has two collars thereon, one at each side of the center, these arms being designated 19, and there is a single spike or prong 20 extending radially from each collar. The shaft 17 has a sprocket wheel 21 at one end through which it may be rotated in timed relation to the travel of the conveyor. As a carton moves under the shaft 17, the points or prongs 20 are positioned to slightly pierce the two longitudinal top flaps of the carton and initially lift them to some small extent. At each side of the conveyor at a point beyond the shaft 17 is a vertical shaft 22 extending upwardly from a gear housing 23. Each shaft 22 has an arcuate shoe 24 secured thereto so positioned that when the shoes 24 are in confronting opposed relation to each other, they will exert a slight pressure against the sides of the carton which passes lengthwise between them. This is indicated in FIG. 4 where the letter C designates a carton with the flaps only slightly lifted. This slight pressure exerted by rotating shoes against the opposite side walls of the carton further aids in raising the longitudinal flaps to a nearly vertical position.

Beyond the rotating pressure shoes 24 at a proper level above the conveyor is a camming structure having a central tongue 26, and at each side thereof there is an upwardly and outwardly-arched bar 27. As the carton with the top flaps partly open moves under the structure 26—27, the flaps are engaged by this structure and opened out to a horizontal position. The cartons, after being thus opened, travel beneath a rail structure 28 that prevents the flaps from closing. At the discharge end of the conveyor 2 the cartons are transferred onto the second conveyor heretofore designated generally as 4. This second conveyor, as previously explained, is at right angles to the conveyor 2.

The rotating shoes 24 and the shaft 17 are driven in isochronism with the conveyor 2. This may be accomplished by means of a transverse shaft 30 having sprocket wheels 31 engaging the sprocket chain 12. The travel of the conveyor thus serves to rotate the shaft 30. At each end of the shaft 30 is a bevel gear 32. Each vertical shaft 22 has a bevel gear 33 at its lower end, and the bevel gears 33 mesh with the bevel gears 32 on their respective sides of the conveyor. At one end of the shaft 30 there is also a sprocket wheel 34 and a sprocket chain 35 passing around the sprocket wheel 34 and the sprocket wheel 21 serves to drive the shaft 17. Actually the sprocket wheels and gearing are enclosed but for clarity of illustration enclosures are omitted and the exact position of the parts is distorted from its exact location.

The conveyor 4 comprises two longitudinally extending fixed supporting rods or bars 36 substantially coextensive with the length of the conveyor 4, these being at approximately the level of the discharge end of the conveyor 2. Between the rods 36 is the upper reach of an endless drag chain conveyor having parallel sprocket chains 37 connected at intervals by transverse flights 38. At the end of the conveyor 4 onto which the cartons are delivered, the chains 37 pass around sprocket wheels 39 on a shaft 40 supported in a frame structure 41. The shaft 40 has a bevel gear 42 at one end meshing with a bevel gear 43 on the end of the shaft 14 at the discharge end of the conveyor 2 so that the conveyor 2 is driven in timed relation or isochronism to the conveyor chains 39, and the power for driving the conveyor 2 is derived through this gearing from the conveyor chains 38.

It will be seen that since the cartons are disposed lengthwise on the conveyor 2, they will be carried by the conveyor 2 onto the conveyor 4 with their long axes transverse to the direction of travel of the chains 39, this direction of travel being indicated by the arrow in FIG. 4.

Over the conveyor 4 near its receiving end is another shaft 45 similar to the shaft 17 having similar pointed prongs 43a thereon positioned at each side of the longitudinal center of the conveyor 4 at a location where one of each of the end flaps of the container carton moving under the shaft 45 will be engaged by the prongs and initially lifted in the manner described in connection with the shaft 17. There are similar rotating shoes 46 which apply pressure to the ends of the carton to aid in lifting the end flaps, and there are arched spreader or opening rails 48 similar to 27 which completes the opening of the end flaps. This mechanism is similar to the mechanism described in detail in connection with FIGS. 4 and 5 and is therefore only schematically illustrated and need here be only generally described. This end flap opening mechanism insofar as shaft 45 and shoes 46 are concerned may be driven from the conveyor chains 36 and gearing in the same way that shaft 17 and shoes 24 in FIGS. 4 and 5 are driven from the chains of conveyor 2.

Figure 3:
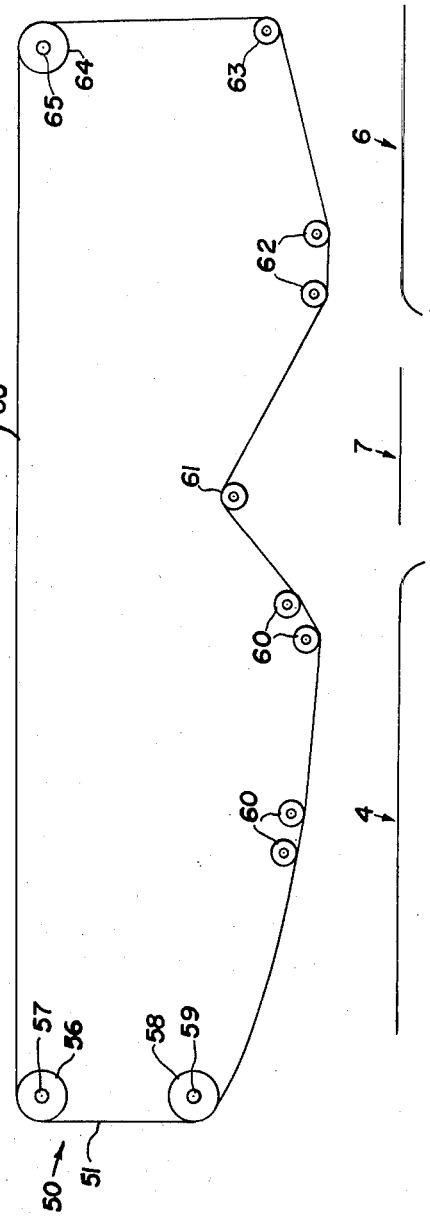
FIG. 3 is a simplified schematic view showing in outline the path of travel of the jar-removing and transporting conveyor with the different stations being indicated.
Figure 6:
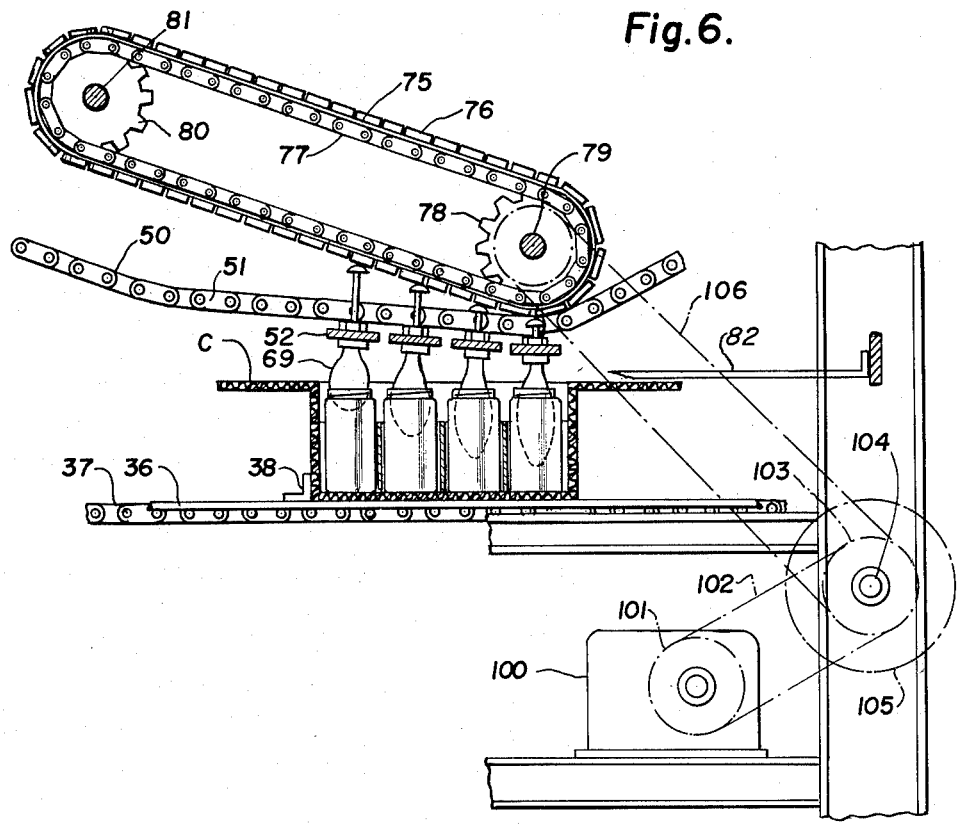
FIG. 6 is a view partly in side elevation and partly in longitudinal vertical section on a larger scale showing the parts at the station where the jars are removed from the carton.

As the cartons with all four flaps now opened outwardly move from the end flaps opening station, they travel under an endless conveyor designated generally as 50 located above the conveyor 4, and which at this point has a reach or portion that converges toward the path of travel of the cartons. The conveyor 50 is comprised of parallel sprocket chains 51 between which extend uniformly spaced groups of four parallel plates 52. As best shown in FIG. 10, each plate 52 has a hanger 53 at each end through which a sprocket chain pivot 54 passes. As shown in FIG. 8, these plates of a group may be hinged together by a hinge connection indicated at 55. This holds them in uniform spaced relation but allows them to pivot independently of one another and to follow the path of the chains. The general contour of this carrier construction comprising the chains 51 and the ball-carrying plates 52 is outlined in FIG. 3. Starting at the left-hand end of FIG. 3, the jar-carrying conveyor passes around sprocket wheels 56 on a drive shaft 57, thence downwardly around sprocket wheels 58 on an idler shaft 59. From the sprockets 59 the belt converges downwardly toward the path of travel of the approaching cartons as above described, and passes under one or more idlers 60. It then rises, being guided over one or more idlers 61, and then is deflected downwardly by idlers 62. From the idler 62 it goes upwardly and is guided under idler 63, passing around sprockets 64 on a shaft 65. There is a return upper reach 66 to the sprockets 56.

Each of the ball-carrying plates 52 has a row of bushings 67 therethrough, the number of bushings corresponding to the number of cells lengthwise of the carton—in this case six—and the spacing of the bushings is such that when one of the plates is positioned over a carton, one bushing will be substantially centered over each cell in a row in the carton. The width of the plates is such that the distance from the center of the bushings on one plate to the center of the corresponding bushings on the next plate corresponds to the distance between the centers of the cells in the direction of travel of the cartons so that one of these bushings can be brought into central position over each cell in the carton as hereinafter more fully described. Secured to the lower end of each bushing by a clamping band 68 is the neck of a resilient rubber ball or bulb 69. All of the balls are of uniform size and their diameters are slightly larger than the mouths of the containers to be handled. Slidably received in each bushing is a pressure rod 70 having its lower end provided with a protective tip 71 that rests against the bottom of the inside of each ball. The upper end of each rod 70 is provided with a mushroom-like top or pressure shoe 72.

Located above that portion or reach of the ball-carrying conveyor which slopes from the idler sprockets 59 toward the idler sprockets 60 is an endless band or belt 75 comprised of a succession of plates 76 extending between parallel sprocket chains 77. The chains 77 pass around sprocket wheels 78 on a lower shaft 79 and around sprockets 80 on an upper transverse shaft 81. The endless belt 75 is in converging relation to the downwardly-sloping reach of the conveyor above which it is located, and also in converging relation to the path of travel of the cartons along the conveyor 4.

As will be hereinafter more fully pointed out, the movement of the ball-carrying conveyor is synchronized to the movement of the conveyor 4. The flights 38 on the conveyor 4 are positioned a predetermined spaced relation to engage a carton when it is delivered to the conveyor 4 and slide it along the supporting rods 36. By reason of the fact that the weight of the cartons is supported on the rods 36, the sprocket chains 37 impart no movement to the cartons until the carton is engaged by one of the flights 38 and it is then pushed along on the supporting rods 36. Because of this timed relation between the movement of the carton and the movement of the ball-carrying conveyor, one ball will be brought into position over the top of each jar of a row, and over one row after another. As the balls are positioned over the jars, the endless belt 75 depresses the push rods 70 by reason of the pressure it exerts on the tops 72 of these rods, and it elongates the ball from the substantially spherical shape shown in the left-hand side of FIG. 8 to the extremely oval shape shown at the right-hand side of FIG. 8. As this elongation takes place, the ball moves into the mouth of the jar until the center of the ball is below the mouth of the jar. At this time the movement of the carton and the synchronized movement of the ball carrier will move each plate in turn from under the belt 75 and the elasticity of the rubber ball will cause it to return to its spherical shape inside the jar, at the same time lifting the push rod 70 back to its normal position. When the ball thus returns to its spherical position, its diameter will be larger than the diameter of the mouth of the jar into which it is inserted. Then the ball carrier moves upwardly from the level of the idler sprocket 60 to the level of the idler sprocket 61, the path of movement of the balls thus diverging from the path of travel of the carton which continues at the same rate of speed, but in a horizontal plane. Thus each row of balls on a ball plate will in turn lift a row of jars out of a row of cells in the carton and raise them to a level entirely clear of the top of the carton.

To insure against the carton lifting as the jars are lifted out, there may be a fixed horizontal bar 82 supported on the frame of the machine at a level to engage the forwardly-extending flap of the carton, and thereafter as the carton progresses and the jars are removed, confine the carton against upward movement. Just beyond the point where all of the jars have been lifted clear of the carton, the leading end of the carton will then project over the end of the conveyor 4 and continued travel of the carton will cause it to be shoved off the end of the conveyor 4.

There is a transverse endless belt conveyor 7 at a level below the level of the rods 36 of the conveyor 4 and the empty carton will drop onto this conveyor as it moves from the conveyor 4 and be carried thereby to one side of the apparatus. The conveyor 7 is an ordinary endless belt conveyor. It may be driven independently of the other conveyors since its function is simply to carry away the empty boxes, or it may be geared to the main drive of the machine to be driven from the same motor.

Figure 2:
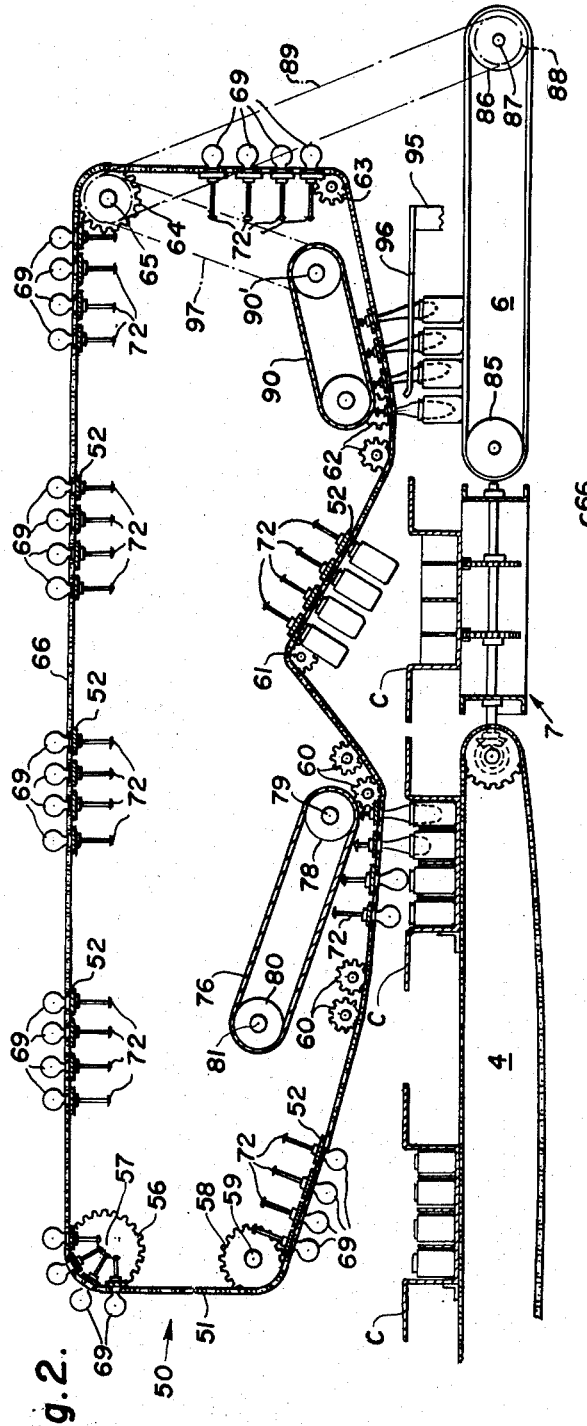
FIG. 2 is a more or less schematic view in the nature of a longitudinal vertical section through the apparatus for removing the jars from the cartons and transferring them to a second conveyor.

On the opposite side of the conveyor 7 from the conveyor 4 with its top at about the same level as the top of the conveyor 4 is an endless jar-receiving conveyor 6 having a belt and a sprocket chain at each side of the belt. The sprocket chain and belt pass around sprocket wheels and roller 85 nearest the empty box conveyor 7 and the opposite end passes around a pulley and sprockets 86 on a transverse shaft 87. This transverse shaft 87 has a sprocket wheel 88 at one end and a drive chain passes around this sprocket wheel 88, and a drive chain 89 passes around this sprocket wheel and a sprocket wheel on the end of the shaft 65. Through this arrangement the receiving conveyor 6 is caused to travel toward the right as viewed in FIG. 2 at the same speed as the ball carrier is moving, and in the same direction. As heretofore noted, the ball-carrying conveyor slopes from the idler 61 toward the idler 62 at which point the bottoms of the jars suspended from the balls are touching on or are just a fraction of an inch above the top of the conveyor 6. Over that reach of the ball carrier extending from the idler 62 to the idler 63, which reach slopes upwardly in the direction of the travel of the conveyor, there is a second endless belt 90 generally similar to the belt 75, this endless belt also comprising a series of rigid plates extending between two sprocket chains, the distance across the belt corresponding substantially to the length of the ball-carrying plates 52. This belt is inclined above the aforesaid reach of the ball conveyor and converges away from said reach. As best seen in FIG. 2, the plates of this endless belt will engage the tops of the push rods 70 of each plate 52 as it moves beneath said belt, pressing down of each push rod in this manner again elongating the balls to the position shown in the right-hand side of FIG. 8. As the jar continues to move in a horizontal plane, the ball which is now stretched to the elongated position, starts to withdraw from the neck of the container and as the ball is withdrawn, the pressure belt 90 starts to relieve the pressure on the push rods so that after the balls have been lifted out of the jars a sufficient distance, they may expand to their normal shape. In order to prevent any jar from being released from the ball on which it is carried, there is a frame 95 arching over the conveyor 6 near its discharge end. It has a forwardly-projecting series of spaced fingers 96 thereon forming a comb under which the tops of the jars move. Should any jar have a tendency to cling to the ball on which it is carried, this comb will hold the jar against lifting movement while allowing the ball to pull upwardly between two teeth of the comb, and thereby assure of the jar being stripped from the ball. This arrangement is provided as a safety measure merely to prevent the possibility of a jar being carried around by the ball carrier through a complete cycle of travel, with the possibility of damage to the jars.

The belt 90 may be driven by a sprocket chain 97 passing around a sprocket wheel on one end of shaft 90 at the upper end of the belt 90 and passing around a sprocket on the shaft 65.

The main driving motor for the machine is designated 100, and it may operate through a reducing gear to drive a sprocket 101. Chain 102 passing around the sprocket 101 passes around the sprocket 103 on the end of a shaft 104. The shaft 104 has sprocket wheels 105 which engage the chains 37 of the conveyor 4 for driving this conveyor. There is also another sprocket on the end of the shaft 104 about which passes a chain 106 that also passes around a sprocket wheel 107 at the end of the shaft 57 for driving the ball-carrying conveyor. The belt 75 may be driven by a sprocket chain passing around a sprocket wheel on shaft 57 and a sprocket wheel on the end of shaft 81.

It will thus be seen that one motor drives the conveyor 2, the conveyor 4, the conveyor 6, the ball-carrying belt, and the belts 75 and 90, and the sprockets and gears are all proportioned so that the balls on each ball-carrying plate will enter a row of jars in a carton when the carton is in proper position and the delivery of the cartons will be exactly speeded to the speed of travel of the balls. The belts 75 and 90 move at the same speeds at the tops of the push rods so that there is little wear or sliding as the plates of the respective belts move into engagement with the tops of the rods and depress them. The conveyor 6 moves at the same speed as the ball-carrying balls so that the withdrawal of the balls from the jars will not result in any drag between the moving balls and the moving jars.

Furthermore, the use of a drag chain conveyor with flights 38' for pushing the cartons along the supporting rods 36 assures the proper positioning of the cartons in relation to the traveling ball carrier, and since the receiving conveyor is driven at the same speed as the conveyor 4, the jars are carried away as fast as they are delivered.

Figure 7:
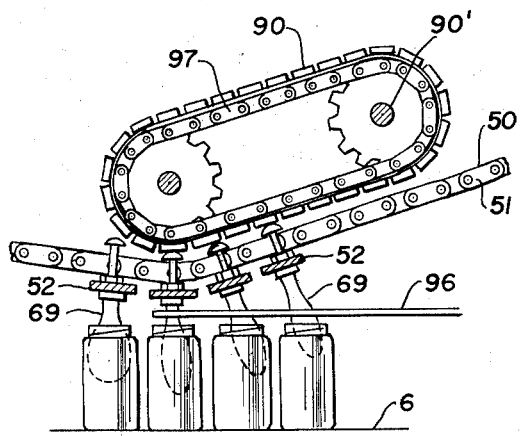
FIG. 7 is a view similar to FIG. 6 of that end of the mechanism where the jars are deposited onto the receiving conveyor after being removed from the carton.

The invention enables cartons of empty jars to be moved in rapid succession through the machine with the jars being lifted out of the cartons by the balls and the inherent tendency of the balls to assume a substantially spherical condition while the entrance of the balls into the containers and their release from the containers is effected by stretching the balls from a generally spherical to an elongated ovoid form. When the ball expands inside the container, its full spherical diameter is larger than the diameter of the neck of the container so that the ball lifts against the internal shoulder of the container where its diameter decreases to join the neck. This is best seen in FIG. 7. After contact is made between the shoulder of the container and the surface of the sphere, the contact is air-tight so that any attempt to pull the ball out of the container tends to produce a vacuum in the container below the ball. This makes it impossible to release the container from the ball so long as the ball retains its spherical shape. When the ball is extended to release the container by operation of the push rod, it will automatically deform to a non-circular section which admits air between the ball and the neck of the container and allow removal to proceed easily. The holding action herein described is effective because, as shown in the drawings, the only opening for air into and out of the jar-engaging ball is through the neck portion of the ball, the area of the ball below the level where it contacts the shoulders of the jars being continuous and without openings so as to be impervious to air. The machine is positive in its operation, and the jars are handled with practically no danger of breakage or chipping, since the balls are the only parts that engage the jars, and being of rubber, and being expanded by their own resilience, they cannot damage the jar, chip them, or exert pressure against the inside of the jar sufficient to damage it.

Referring to the modifications shown in FIGS. 11 and 12, there is here illustrated an alternative mechanism for initially opening the cover flaps of the carton to replace the rotating prong devices 20 and 45a of FIGS. 1 and 5. In the modifications shown in FIGS. 11 and 12 suction cups are used to initially lift the flaps instead of the rotating prongs and in FIGS. 11 and 12 we have shown only so much of the apparatus as is necessary to an understanding of this modification. Located over the conveyor 2 or over the conveyor 4 depending upon which position is considered there is a fixed transverse shaft or supporting rod 110. Loosely mounted on the rod 110 so as to be free to rock in a vertical arc are two rocker arms 111, these arms being positioned at opposite sides of the center line of the conveyor so that one arm will be positioned over one closed flap of the box traveling along the conveyor and the other arm over the other flap as the box moves under the arms. At the outer end of each arm there is a flexible tube 112 that passes through the arm and which has a nipple 113 at its lower end. This nipple passes through a supporting block 114. There is a compression and torsion spring 115 confined between the block 114 and the outer end of the arm 111. At the free end of the nipple 113 there is a rubber vacuum cup 116. The arrangement is such that the arm 111 may be rocked downwardly to bring the suction cup 116 against a flap F of the carton C while there is sufficient flexibility in the mounting of the cup 116 of the arm to allow for any variation in the vertical height of the flap. For raising the arms 111 there is a shaft 117 extending transversely of the conveyor. This shaft has eccentric cams 118, one under each arm 111 and each arm 111 has a cam follower in the form of a roller 119 thereon which bears against the periphery of the cam. There is a fixed arm 120 on the shaft 110 adjacent the rocker arm 111 and a tension spring 121 is connected to the arm 120 to a vertical projection 122 on arm 111. This spring urges the rocker arm 111 downwardly to yieldably press the vacuum cup 116 against the box flap to be lifted while the cam 118 operates in opposition to the spring 121 to lift the rocker arm 111. The shaft 117 is driven in timed relation to the travel of the conveyor 2 through a sprocket or gearing similar to that shown in FIG. 4 for driving the shaft 117 and this part of the mechanism has not been illustrated.

With this arrangement as each carton comes under the vacuum cups the timing of the cam is such as to let the rocker arms 111 lower. Tubes 112 are connected to a vacuum pump and as the cups contact the flaps the flaps are held by suction against the cups and the cams then start to lift the flaps. This engagement exists only for an instant during which time the box is also traveling longitudinally and the flexible mounting of the cups on the blocks 114 allows them to travel with the flaps with which they are engaged long enough for the flap to be lifted to a point where the squeezing of the flaps by the shoes 24 will lift them further. Valves not shown in the suction lines release the suction at the proper time. These valves may of course be synchronized with the operation of the cam 118 and the rotation of the shaft 117 and may be simple ordinary spring closed valves which are depressed by other cams on the shaft 117 to momentarily open them to the suction line.

While we have shown and described one particular embodiment of our invention, it will be understood that this is by way of illustration and that various changes and modifications may be made in the particular construction and arrangement of parts within the contemplation of our invention and under the scope of the following claims.

We claim:

1. Apparatus for lifting and transporting necked containers comprising a resilient normally substantially spherical ball having a neck, the ball having an air opening therein only through the neck, a mounting plate to which the neck is secured and from which the ball is suspended by the neck, conveyor means movable in a predetermined path on which the mounting plate is carried, a push rod extending through the plate and into the lower end of the ball for elongating the ball when the push rod is depressed and permitting the ball to expand by its inherent resilience when pressure on the rod is released, the upper end of the rod projecting above said mounting plate, and cooperating means in the path of travel of the conveyor means for depressing the push rod as the mounting plate is carried by the conveyor past said cooperating means, and means for locating and supporting a carton of necked containers under the conveyor in position for the elongated ball to enter the container neck, and at a level where the ball, when it expands to its spherical shape, will have its full diameter within the container below the neck so as to make an internal contact with the walls of the container below the neck.

2. Apparatus for lifting and transporting containers comprising a resilient normally substantially spherical ball having a neck, the ball having an air opening therein only through the neck, a mounting plate to which the neck is secured and from which the ball is suspended by the neck, a push rod extending through the plate and into the lower end of the ball for elongating the ball when the push rod is depressed and permitting the ball to return to its spherical shape by its own resilience when pressure on the push rod is released, the upper end of the rod projecting above said mounting plate, a carrier movable vertically and horizontally from one station to another on which the mounting plate is supported, means at one station for depressing said push rod as the carrier moves downwardly and releasing it as the carrier starts to ascend, means at another station for depressing said push rod when the carrier has moved down and releasing it after the carrier has lifted a predetermined amount, and means at each of said stations for supporting a container having a reduced neck open at a level where the expanded ball will be inside the container with its maximum diameter below the neck of the container.

3. Apparatus for lifting and transporting containers as defined in claim 2 in which there is a row of such resilient balls on the mounting plate each with its separate push rod and the rod-depressing means at the respective stations simultaneously depresses the rods of all of the balls on said plate at once.

4. Apparatus for lifting and transporting containers comprising a resilient normally substantially spherical ball having a neck, a mounting plate to which the neck is secured and from which the ball is suspended by the neck, a push rod extending through the plate and into the lower end of the ball for elongating the ball when the push rod is depressed, the upper end of the rod projecting above said mounting plate, an endless conveyor chain on which the mounting plate is carried, means for guiding the conveyor chain downwardly on a slope to a first low point and then guiding it upwardly and laterally and then downwardly on a slope to a second low point and then upwardly and through a return flight to the first downward slope, a succession of similar mounting plates with balls and push rods at intervals along the conveyor chain, means for moving containers to be transported under the first downward slope of the conveyor to the first low point, means for depressing the push rods as they approach said first low point and elongating the balls into the mouths of the containers and for releasing said push rods as the conveyor moves upwardly from the first low point whereupon the balls through their own inherent resilience expand in the mouths of the containers, means under the second low point for receiving containers and moving them away from said second low point, and means for depressing the push rods as they reach said second low point to again elongate the balls and gradually release said push rods from the depressed position as the conveyor moves up the slope from the second low point.

5. Apparatus for lifting and transporting containers as defined in claim 4 in which there is a common drive for moving the containers and conveyor chain with equal horizontal components of speed whereby successive containers may be positioned under and travel coincidentally with successive balls to the first low point and for driving the first rod-depressing means in synchronism with the conveyor chain.

6. Apparatus for lifting and transporting containers as defined in claim 4 in which the means for depressing the push rods as they approach the first low point is a continuous belt having a lower reach above the first downward slope of the conveyor chain and sloped at a steeper angle toward the first low point whereby to progressively depress the push rods with the maximum depression at the first low point, said endless belt clearing the push rods at the place where the conveyor chain inclines upwardly from the first low point, the means for depressing the push rods at the second low point being a similar belt having its lower end nearest the conveyor chain at the second low point and inclined upwardly from the second low point at a steeper angle than the upward slope of the conveyor chain from the second low point.

7. Apparatus for lifting jars from the cells of shipping cartons and transporting them comprising a first carton-carrying endless conveyor having a receiving end and a discharge end, means intermediate said ends for lifting and opening out flaps at each side of the carton, a second carton conveyor at right angles to the first at the discharge end of the first for receiving cartons from the first carton conveyor and moving them in a horizontal direction at right angles to said first conveyor, means intermediate the ends of the second carton conveyor for opening the end flaps of a carton moving therealong, an empty carton-receiving conveyor at the end of the second conveyor and positioned at right angles thereto and positioned for receiving cartons from the second conveyor and carrying them to one side of the apparatus, a jar-receiving conveyor in line with the second carton conveyor and positioned at the opposite side of the empty carton-receiving conveyor, an endless chain conveyor positioned above the second carton conveyor, the empty carton-receiving conveyor and the jar-receiving conveyor, said endless chain conveyor having groups of transversely-elongated mounting plates thereon, the number of plates in a group corresponding to the number of rows of cells in a carton which are crosswise of the direction of travel of a carton moving along the second carton conveyor with the center-to-center spacing of the plates of the groups equal to the center-to-center spacing of said rows, each plate having a number of push rods passing therethrough along its center line and slidable in a direction normal to the plane of the plates, said push rods being centered from one another a distance corresponding to the center-to-center spacing of the carton cells, the chain conveyor having a lower jar-lifting and transporting and depositing reach above the second carton conveyor and jar-receiving conveyor and an upper return reach above the lower one, each plate having a generally spherical resilient deformable ball attached to the surface which faces downwardly on the lower reach of the chain conveyor, the balls being centered about the push rods with one rod projecting into each ball, the upper end of each rod in this position extending upwardly above the plate on which it is carried, said lower reach of the chain conveyor being guided on a downward slope toward a low point above the second carton conveyor, then upwardly on an incline from the first low point and over the empty carton-receiving conveyor at an elevation and then on a downward slope to a second low point located above the jar-receiving conveyor, and finally up a second incline, the second carton conveyor and the chain conveyor being synchronized to center the carton cells under the balls of a group of mounting plates as such balls move toward the first low point, means engaging the push rods to depress them and elongate the balls as they approach the first low point and release them after they pass such low point and before they move upwardly on an incline from said low point, and means over the second low point for depressing them to again elongate the balls and gradually release them as the lower reach moves up said second incline.

8. Apparatus for lifting jars from the cells of shipping cartons and transporting them as defined in claim 7 in which a comb having spaced fingers is located over the receiving conveyor under the second upward incline of the chain conveyor, the comb comprising a support with arms projecting forwardly in a position to extend between the balls on the plates at a level above the tops of the jars being transported.

9. Apparatus for lifting jars from the cells of partitioned shipping cartons and transporting them comprising first conveyor means for moving the cartons with the mouths of the jar opening upwardly in a generally horizontal direction, a jar-receiving means in line with but spaced from the first conveyor, an empty carton disposal station between said first conveyor and the jar-receiving means, an endless carrier supported above the first conveyor, the jar-receiving means and the empty carton disposal station, the endless carrier having groups of mounting plates thereon at spaced intervals, each group of mounting plates having a plurality of resilient generally spherical hollow balls projecting from one surface thereof, the number and position of the balls corresponding to the number and position of jars in the cartons, each ball having a push rod therein slidably passed through the mounting plate on which the ball is carried and projecting from the opposite side thereof, said endless carrier having a lower reach in which the balls depend from the mounting plate, means for driving the endless carrier in a direction such that the lower reach moves in the same direction as the first conveyor and in synchronism therewith, said apparatus having means for guiding the lower reach of the endless carrier in the direction of its travel in a downwardly-sloping direction toward a first low point over the first conveyor, then upwardly on an incline and over the carton disposal station and then on a second downwardly-sloping direction over the jar-receiving means and then on an upward incline and thence to the return reach, means for depressing the push rods as they approach the first low point to elongate the balls to a diameter where they may enter the mouths of the jars in a carton moving under said low point and for then releasing the push rods to allow the balls to expand entirely by their inherent resilience in the jars and thereby lift and transport the jars as the mounting plates travel along said first upward incline, means for depressing the push rods to again elongate the balls at the second low point and release the jars and for holding them depressed as the mounting plates travel up the second incline until the balls have reached a level where they may assume a spherical shape above the jars so deposited on the receiving means.

10. Apparatus for lifting jars from the cells of partitioned shipping cartons and transporting them as defined in claim 9, wherein the jar-receiving means is an endless conveyor which is driven synchronously and at the same speed as the jars being deposited thereon, and a common drive for the first conveyor, the endless carrier and the jar-receiving conveyor.

11. Apparatus for lifting jars from the cells of partitioned shipping cartons and transporting them as defined in claim 9, wherein said push rod depressing means over the first low point comprises an endless transversely rigid belt over the first downwardly-sloping portion of travel thereof having a lower reach traveling in the same direction as the endless carrier and which converges toward said portion of the carrier to progressively depress the push rods and terminating its contact with the push rods before they have traveled up said first incline, the push rod depressing means at the second low point comprising a similar endless belt having a lower reach traveling in the same direction as the carrier located above the second low point with its lower end closest to the carrier at said second low point, said last-named reach of the second endless belt diverging from the second upwardly-inclined portion of the endless carrier.

12. Apparatus for lifting jars from the cells of partitioned shipping cartons and transporting them as defined in claim 9, wherein said push rod depressing means over the first low point comprises an endless transversely rigid belt over the first downwardly-sloping portion of travel thereof having a lower reach traveling in the same direction as the endless carrier and which converges toward said portion of the carrier to progressively depress the push rods and terminating its contact with the push rods before they have traveled up said first incline, the push rod depressing means at the second low point comprising a similar endless belt having a lower reach traveling in the same direction as the carrier located above the second low point with its lower end closest to the carrier at said second low point, said last-named reach of the second endless belt diverging from the second upwardly-inclined portion of the endless carrier, and means for driving said endless belts for depressing the push rods from said common drive and in isochronism with the push rods which they engage.

13. Apparatus for lifting jars from the cells of partitioned shipping cartons and transporting them as defined in claim 9, in which said first conveyor comprises fixed rails for supporting the cartons and a chain with spaced flights thereon for shoving the cartons along the rails to a position below and beyond said first low point of the endless carrier, and means for driving the chain and the endless carrier in isochronism to bring the jars into centered position under the balls.

References Cited in the file of this patent
UNITED STATES PATENTS

| | | |
|---|---|---|
| 2,446,661 | Murdock | Aug. 10, 1948 |
| 2,818,987 | Krupp et al. | Jan. 7, 1958 |
| 3,011,667 | Copping | Dec. 5, 1961 |
| 3,019,924 | Krupp et al. | Feb. 6, 1962 |